(12) United States Patent
Guemmer

(10) Patent No.: US 10,584,604 B2
(45) Date of Patent: Mar. 10, 2020

(54) GROUP OF BLADE ROWS

(71) Applicant: Rolls-Royce Deutschland Ltd & Co KG, Blankenfelde-Mahlow (DE)

(72) Inventor: Volker Guemmer, Mahlow (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 982 days.

(21) Appl. No.: 14/659,888

(22) Filed: Mar. 17, 2015

(65) Prior Publication Data
US 2015/0267548 A1 Sep. 24, 2015

(30) Foreign Application Priority Data
Mar. 20, 2014 (DE) .......................... 10 2014 205 235

(51) Int. Cl.
*F01D 9/04* (2006.01)
*F04D 29/54* (2006.01)
(Continued)

(52) U.S. Cl.
CPC .............. *F01D 9/042* (2013.01); *F01D 5/146* (2013.01); *F01D 9/041* (2013.01); *F01D 9/044* (2013.01);
(Continued)

(58) Field of Classification Search
CPC .......... F01D 9/041; F01D 9/042; F01D 9/044; F01D 5/146; F01D 11/001; F04D 29/544; F04D 29/548; F04D 29/606; F04D 29/542; F04D 29/602; F04D 29/644; F05D 2240/60; F05D 2230/60; F05D 2240/12; Y02T 50/673
See application file for complete search history.

(56) References Cited

U.S. PATENT DOCUMENTS 4,395,195 A * 7/1983 De Cosmo .............. F01D 9/042
415/137
6,099,245 A 8/2000 Bunker
(Continued)

FOREIGN PATENT DOCUMENTS

DE 102011084125 4/2013
EP 2218876 8/2010
(Continued)

OTHER PUBLICATIONS

German Search Report dated Dec. 1, 2014 for counterpart German Applicaiton No. DE 10 2014 205 235.1.
(Continued)

*Primary Examiner* — Kenneth Bomberg
*Assistant Examiner* — Julian B Getachew
(74) *Attorney, Agent, or Firm* — Shuttleworth & Ingersoll, PLC; Timothy J. Klima

(57) ABSTRACT

A blade row group arrangeable in a main flow path of a fluid-flow machine and including N adjacent member blade rows firmly arranged relative to one another in both the axial direction and the circumferential direction is provided. Here, a front member blade row with front blades as well as a rear member blade row with rear blades are provided in the meridional plane established by the axial direction and the radial direction. The blade row group has two main flow path boundaries. It is provided that the blades of the member blade rows are fixed to the one main flow path boundary in the surrounding structure by means of a blade root structure, and that the blades of the member blade rows on the other main flow path boundary are each firmly connected to a base.

10 Claims, 16 Drawing Sheets

(51) Int. Cl.
  *F04D 29/60* (2006.01)
  *F01D 25/24* (2006.01)
  *F04D 29/64* (2006.01)
  *F01D 5/14* (2006.01)
  *F01D 11/00* (2006.01)

(52) U.S. Cl.
  CPC .......... *F01D 11/001* (2013.01); *F01D 25/246* (2013.01); *F04D 29/542* (2013.01); *F04D 29/544* (2013.01); *F04D 29/548* (2013.01); *F04D 29/602* (2013.01); *F04D 29/606* (2013.01); *F04D 29/644* (2013.01); *F05D 2230/60* (2013.01); *F05D 2240/12* (2013.01); *Y02T 50/673* (2013.01)

(56) References Cited

U.S. PATENT DOCUMENTS

| | | |
|---|---|---|
| 6,511,285 B2 | 1/2003 | Dodd |
| 7,329,087 B2 * | 2/2008 | Cairo .................. F01D 5/147 415/135 |
| 7,445,426 B1 | 11/2008 | Matheny et al. |
| 8,534,997 B2 | 9/2013 | Guemmer |
| 2008/0134685 A1 | 6/2008 | Bunker et al. |
| 2010/0303629 A1 * | 12/2010 | Guemmer .............. F01D 5/146 416/223 R |
| 2013/0039753 A1 | 2/2013 | Ikeguchi et al. |

FOREIGN PATENT DOCUMENTS

| | | |
|---|---|---|
| EP | 2261463 | 12/2010 |
| EP | 2833001 | 2/2015 |
| JP | 2011196254 | 10/2011 |
| WO | 2012095220 | 7/2012 |

OTHER PUBLICATIONS

European Search Report dated Aug. 6, 2015 for related European Appl. No. 15157763.2.

* cited by examiner

View A-A

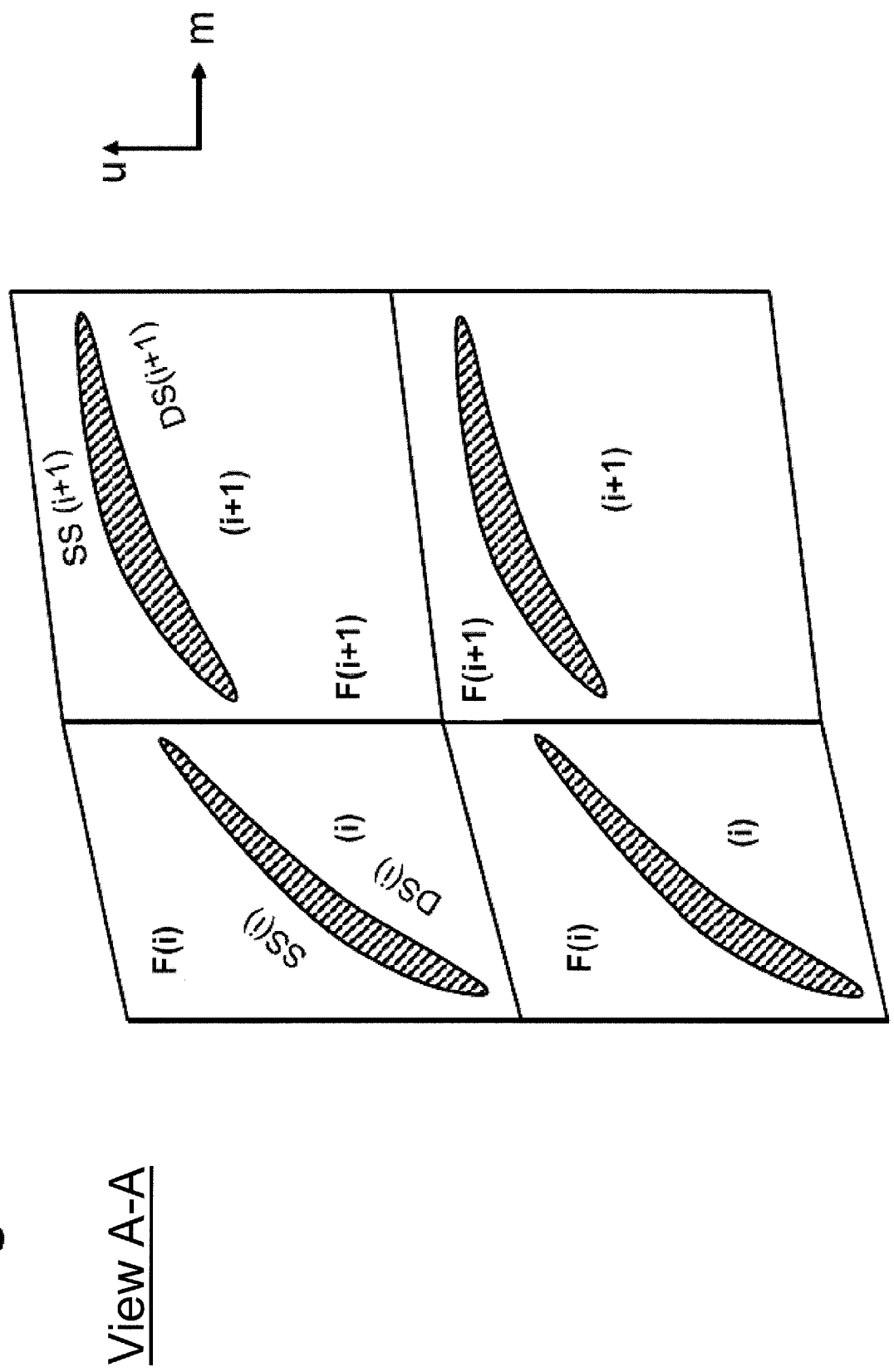

View A-A

View A-A

View A-A

GROUP OF BLADE ROWS

CROSS-REFERENCE TO RELATED APPLICATION

This application claims priority to German Patent Application No. 10 2014 205 235.1 filed on Mar. 20, 2014, the entirety of which is incorporated by reference herein.

BACKGROUND

This invention relates to a blade row group. In particular, the invention relates to a stator vane row group.

The aerodynamic loadability and the efficiency of fluid-flow machines, in particular blowers, compressors, turbines, pumps and fans, is limited by the growth and the separation of boundary layers near and on the hub and casing walls. State of the art in fluid-flow machines are arrangements with double-row stator wheels, usually employed as outlet guide vane assemblies in compressors, or also double-row rotor vane arrangements in which directly adjacent rotors operate counter-rotatingly, or in which two directly adjacent rotor blade rows are attached to a common drum. A fluid-flow machine of this type is known for example from EP 2 261 463 A2.

In any event, the problem arises in blade group arrangements, on account of the intended axially narrow spacing between the member blade rows, that the fixing of the involved blades to the hub and inside the casing is difficult to implement in terms of design, so that new solutions are required to achieve a compact design of the machine. This applies in particular to stator vane row groups.

SUMMARY

An object underlying the present invention is to provide a blade row group that enables the fixing of the blades of the blade row group to the main flow path boundaries to be achieved successfully due to its compact design.

It is a particular object of the present invention to provide solution to the above problems by a blade row group having the features as described herein.

Accordingly, the solution in accordance with the invention provides a blade row group that is arrangeable in a main flow path of a fluid-flow machine and includes N adjacent member blade rows firmly arranged relative to one another in both the axial direction and the circumferential direction. Here, a front member blade row with front blades having a leading edge and a trailing edge as well as a rear member blade row with rear blades having a leading edge and a trailing edge are provided, and the blade row group has two main flow path boundaries.

It is provided in accordance with the invention that the blades of the member blade rows are fixed to the one main flow path boundary in the surrounding structure by means of a blade root structure, and that the blades of the member blade rows on the other main flow path boundary are each firmly connected to a base, with a front base of a blade of a front member blade row and an adjacent rear base of a blade of a rear member blade row being integral parts of a shroud structure embedded into a cavity. A further integral part of the shroud structure is a support connected to at least one of these bases by means of a positive or material-based connection or designed in one piece with them, where the support has a surface facing away from the main flow path and suitable for being opposite an adjoining surface of a fluid-flow machine.

The invention provides a structurally compact blade row group with a shroud structure, having a support connected on the one hand to at least one of the bases of two adjacent blades of a front and a rear member blade row, the result being that a connection of the two bases is provided and/or secured and/or the support is held in the shroud structure; on the other hand, the support has a surface facing away from the main flow path and opposite an adjoining surface of the fluid-flow machine. This surface can, due to its properties or due to an applied abradable coating or an applied sealing fin arrangement, in particular be used to seal a cavity, inside which the shroud structure is located, against leakage flows.

In a stator vane row group, the shroud structure is arranged inside a cavity at the inner main flow path boundary. The support is in this case an internal support whose surface facing away from the main flow path is opposite the rotating surface of the rotor shaft of the fluid-flow machine.

It can be provided that the bases of two adjacent member blade rows on the main flow path boundary form a surface closed in the entire area of the member blade rows and wetted by the main fluid flow.

The base of a member blade row can be provided in the circumferential direction in the area of a blade as a single blade root, or form a ring segment in the circumferential direction in the area of several blades, or can be designed as a complete ring over the entire circumference.

An integral design or a modular design can be provided for the bases, where the integral design provides a structural connection of the bases of adjacent member blade rows, achieved by a brazed or welded connection or by one-piece production, and the modular design provides for joining together the bases of adjacent member blade rows.

An embodiment of the invention provides a modular design of the bases, with the support being connected to the bases of the front and rear member blade rows, thus securing the connection of the two bases. The support has a holding structure anchored in each base of the member blade rows, i.e. a front holding structure anchored in the base of the front member blade row and a rear holding structure anchored in the base of the rear member blade row. Each of the holding structures fixes the support in the member blade row in at least one direction due to its shape.

It can be provided here that each holding structure engages in a recess in the respective base, where the recess at the base of the front member blade row is provided on that side of the base facing upstream, and the recess at the base of the rear member blade row is provided on that side of the base facing downstream. It can furthermore be provided that the two holding structures face one another and in this way hold together the bases of the member blade rows in the axial direction. It can also be provided that the front holding structure is arranged, relative to the axial direction, in the area close to the blade leading edge of the front member blade row, and the rear holding structure is arranged in the area close to the blade trailing edge of the rear member blade row.

A further embodiment of the invention provides that on the base of the front member blade row a holding structure is provided that is substantially directed upstream and provided axially downstream of the blade leading edge of the front member blade row, and that on the base of the rear member blade row a holding structure is provided that is substantially directed downstream and provided axially upstream of the blade trailing edge of the rear member blade row. The holding structures are here each anchored in a recess inside the support, with the support being fixed in at least one direction both in the front and in the rear member blade row, due to the shapes of the holding structures and recesses.

It can be provided here that in a meridional plane, the support together with one base each of the two member blade rows forms a cavity inside the shroud structure. It can furthermore be provided that at least one of the two cavities is designed substantially closed and is surrounded by one of the bases and by the support.

According to a design variant of the invention, it is provided that the shroud structure, formed jointly by the bases of the member blade rows and by the support, has in a meridional plane a substantially rectangular outer outline.

A further embodiment provides that in a plane established by the meridional coordinate and by the circumferential coordinate at the inner main flow path boundary the bases of the blades of both member blade rows are formed by individual blade roots with rectangular outline.

A further embodiment provides that in a plane established by the meridional coordinate and by the circumferential coordinate at the inner main flow path boundary the bases of the blades of at least one of the member blade rows are formed by individual blade roots with parallelogram-shaped outline. It can be provided here that the bases of the blades of both member blade rows are formed by individual blade roots with parallelogram-shaped outline, with the front corners of the base of the rear member blade row being provided directly on the rear corners of the base of the front member blade row, and the lateral edges of the bases of the two member blade rows forming a straight or angled line.

According to an embodiment of the present invention, it is provided that those edges of the bases of the front member blade row facing away from the main flow together with those edges of the bases of the rear member blade row facing the main flow are each provided constant in the circumferential direction, but alternatingly axially offset from blade to blade, to ensure a fixed relative position between the blades of the two member blade rows.

According to a further embodiment of the present invention, it is provided that those edges of the bases of the front member blade row facing away from the main flow together with those edges of the bases of the rear member blade row facing the main flow are each provided obliquely relative to the circumferential direction, to ensure a fixed relative position between the blades of the two member blade rows.

A further embodiment of the present invention provides that those edges of the bases of the front member blade row facing away from the main flow together with those edges of the bases of the rear member blade row facing the main flow are each provided contoured and with varying axial position in the circumferential direction, to ensure a fixed relative position between the blades of the two member blade rows.

According to a further embodiment, at least one of the bases of the front and rear member blade rows with at least part of the support forms a joint component. It can be provided here that the two member blade rows in the area of the support are connected to one another by a welded or brazed connection.

A further embodiment of the invention provides that the bases of the adjacent front and rear member blade rows are structurally integrated with one another and form a uniform overall base. It can be provided here that the overall base at at least one position, in particular at two positions, is connected to the support by a brazed or welded connection. It can also be provided that the base has in the meridional view a substantially U-shaped cross-section and the support has in the meridional view a substantially rectangular cross-section, or vice versa.

According to a further embodiment, the bases of the front and rear member blade rows and the support are structurally integrated with one another and designed as a unit. It can be provided here that the base and at least one blade each of the two member blade rows and the support are structurally integrated with one another as a unit. An arrangement of this type can be manufactured for example by a laser-assisted production method, as provided by laser sintering, laser printing, direct laser depositioning or related processes.

A further embodiment of the invention provides that on that surface of the support facing away from the main flow path, an abradable coating is provided which likewise belongs to the integral component and accordingly is manufactured in a standardized laser-assisted production method jointly with at least one blade each of the member blade rows and the internal support. This can be achieved by a casting or injection moulding method.

A further embodiment of the invention provides that on one of the cavity-limiting surfaces of the support or on a rotor shaft surface adjoining the cavity, one or more sealing fins, for example three sealing fins, are provided for reducing leakage flows through the cavity.

The present invention relates to blades of fluid-flow machines, such as blowers, compressors, pumps, fans and turbines of the axial, semi-axial and radial type using gaseous or liquid working medium. The fluid-flow machine may include one or several stages, each stage having a rotor and a stator, in individual cases, the stage is formed by a rotor only. The rotor includes a row of blades or several adjacent blade rows forming a group, which are connected to the rotating shaft of the machine and exchange energy with the working medium. An application in fluid-flow machines where the rotor transfers energy to the working medium is favourable in accordance with the invention. The rotor may be provided with shroud or running gap at the outer blade end. The stator includes a row of stationary vanes or several adjacent vane rows forming a group, which may either feature a fixed or a free vane end with gap on the hub and on the casing side.

Rotor drum and blading are usually enclosed by a casing, in other cases (e.g. aircraft or ship propellers) no such casing exists. The machine may also feature a stator, a so-called inlet guide vane assembly, upstream of the first rotor. Departing from the stationary fixation, at least one stator or inlet guide vane assembly may be rotatably borne, to change the angle of attack. Variation is accomplished for example via a spindle accessible from the outside of the annulus duct. In an alternative configuration, multi-stage types of said fluid-flow machine may have two counter-rotating shafts, with the direction of rotation of the rotor blade rows alternating from stage to stage. Here, no stators exist between subsequent rotors. Finally, the fluid-flow machine may—alternatively—feature a bypass configuration such that the single-flow annulus duct divides into two concentric annuli behind a certain blade row, with each of these annuli housing at least one further blade row.

BRIEF DESCRIPTION OF THE DRAWINGS

The present invention is more fully described in the following with reference to the figures of the accompanying drawing showing several exemplary embodiments.

FIG. 2c shows an arrangement of two member blade rows in accordance with the present invention (circumferential view in section A-A from FIG. 2a).

DETAILED DESCRIPTION

Figure 1:
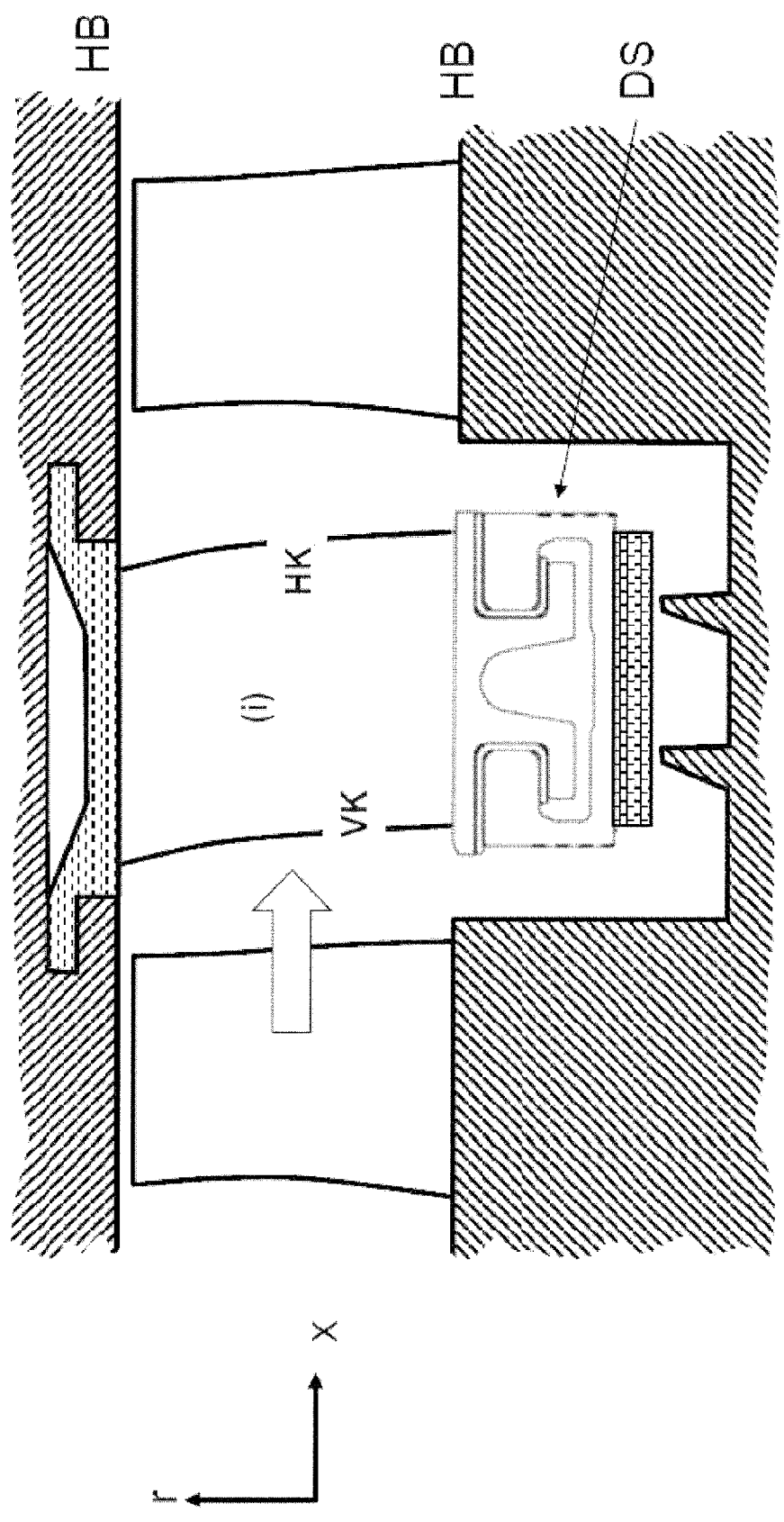
FIG. 1 shows a design of a flow duct of a fluid-flow machine in accordance with the state of the art.

FIG. 1 shows, in the meridional plane established by the axial direction x and the radial direction r, the section of a fluid-flow machine with a stator vane row having vanes (i) in accordance with the state of the art. The stator vane row is arranged inside a main flow path of the fluid-flow machine, which is delimited by two main flow path boundaries HB. The vanes (i) are held at one vane end in a structure forming the one main flow path boundary HB by means of a vane root. The other vane end is connected to a shroud structure DS. Further stator rows of the fluid-flow machine are similarly fastened at some distance from one another. The flow here is, as per the drawing, from left to right and accordingly passes first the leading edge VK and then the trailing edge HK of the vanes (i).

A particular structural requirement diverging from the state of the art is added when member blade rows (vane rows) of a blade row group are to be arranged one behind the other as narrowly as possible in the flow direction of the machine, as for example in a stator vane row group, including at least two similar directly adjacent member vane rows with shroud structure, not changing their relative position to one another (both in the circumferential direction and in the meridional direction).

Figure 2A:
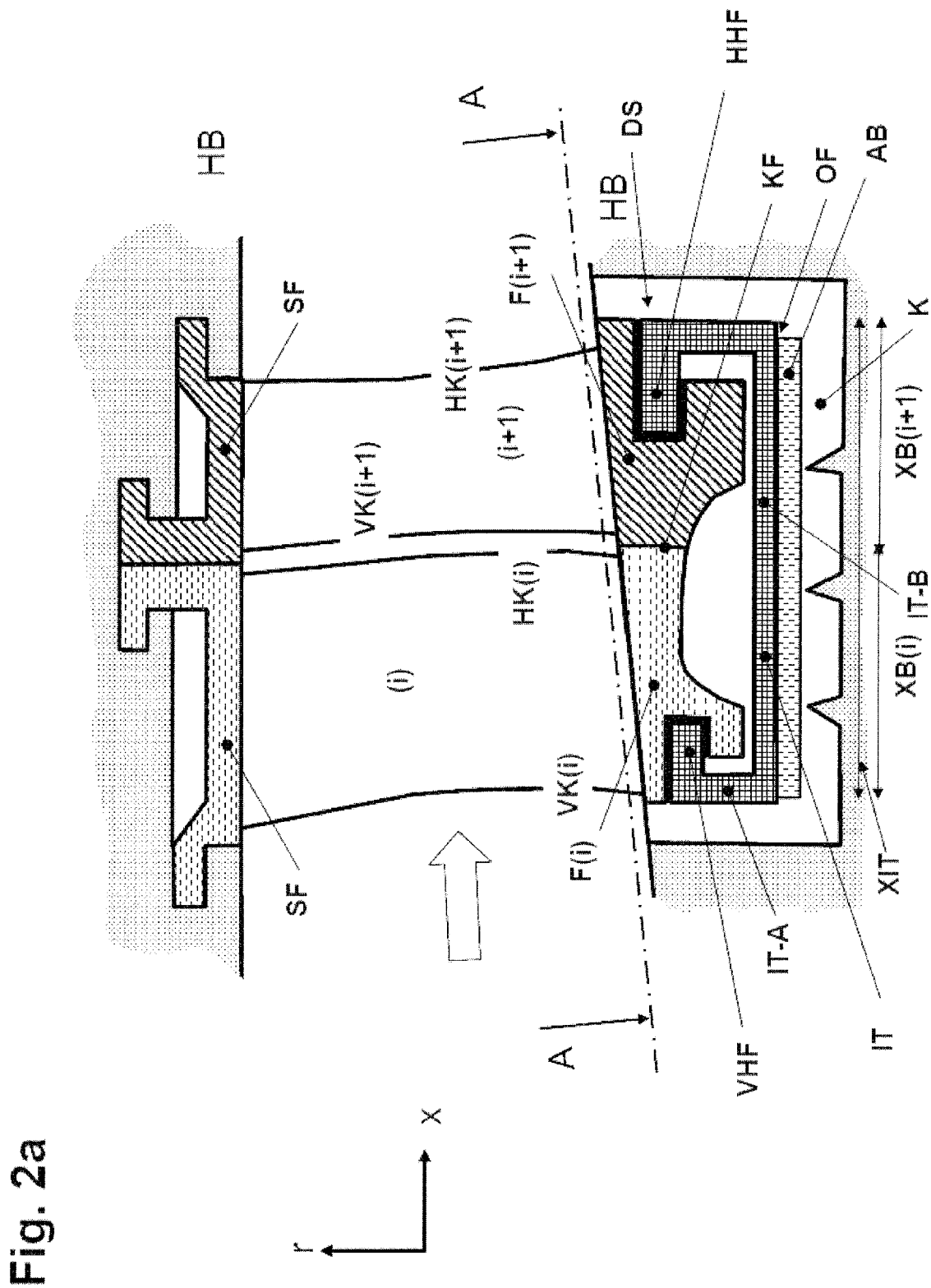
FIG. 2a shows a stator vane group in accordance with the present invention with frontal meshing at the vane root.

FIG. 2a shows, in a meridional plane established by the axial direction x and the radial direction r, a stator vane row group in accordance with the present invention including two directly adjacent stator vane rows (i) and (i+1).

The leading and trailing edges of the vanes of the front row (i) are identified with VK(i) and HK(i), while the leading and trailing edges of the vanes of the rear row (i+1) are identified with VK(i+1) and HK(i+1).

It is pointed out that for purposes of a clearer illustration in FIG. 2a and also in the other figures, no distinction is made between the identification of the member blade rows (i) and (i+1) and the identification of the individual members or blades in the member blade rows, i.e. the members or blades of the blade rows too are identified with (i) and (i+1).

The blade profile represents the aerodynamically relevant part of a blade around which gas flows (unlike a blade root, for example). For purposes of a clearer illustration in the figures, no distinction is made between the identification of the blade profile and the identification of the respective blade.

A configuration of more than two member blade rows, e.g. three member blade rows, is also in accordance with the invention. The two member blade rows shown can, in accordance with the invention, also be formed in the same way by two member blade rows from a combination of three or more member blade rows.

The two blade row members (i) and (i+1) shown have at both blade ends a firm connection to the structure forming the main flow path boundary. The radially outer ends of the blade row members (i) and (i+1) are here each fixed to the outer main flow path boundary HB by means of a blade root structure SF in the surrounding structure. The blade root structure SF can have here a single blade root or a blade root ring segment extending over several blades (vanes) in a stator vane row or a complete ring extending over all vanes in a stator vane row. In the context of the present invention, the precise type of blade root structure is immaterial. The present invention focuses on the fixing of the radially inner ends of the blade row members (i) and (i+1) in a shroud structure DS, as explained in the following.

In the area of the inner fixed blade end, the blade profiles associated with the member blade rows are provided on a base F(i), F(i+1), said base F(i), F(i+1) being associated with an individual blade root, a ring segment extending in the circumferential direction over several blades, or a complete ring closed in the circumferential direction. The bases F(i), F(i+1) of two adjacent member blade rows (i) and (i+1) form on the main flow path boundary HB a surface closed in the entire area of the member blade rows (i) and (i+1) and wetted by the main fluid flow, with either integral design or modular design being provided for the bases, where integral design provides a structural connection of the bases (i) and (i+1), achieved by a brazed or welded connection or by production in one piece, and modular design provides joining together of the bases (i) and (i+1).

FIG. 2a shows the example of a modular design. In at least one meridional plane, established by the axial direction x and the radial direction r, the bases F(i), F(i+1) of two adjacent member blade rows (i) and (i+1) adjoin one another at at least one point on the main flow path boundary. Also favourable here is the contact of two adjacent member blade rows (i) and (i+1) along a line starting from the main flow path boundary and oriented obliquely or transversely to the main flow direction.

It can be provided that the bases F(i), F(i+1) of two adjacent member blade rows (i) and (i+1) adjoin one another not only in a meridional plane (r, x), but also along at least one section of the circumference of the fluid-flow machine.

The base F(i) of the blades (i) of the front member blade row and the base F(i+1) of the blades (i+1) of the rear member blade row are those parts of a shroud structure DS which are closest to the main flow path. The shroud structure DS is embedded into a cavity K in the hub of the machine and has as a further element an internal support IT, said internal support IT forming a surface OF facing away from the main flow path of the fluid-flow machine and suitable for being opposite an adjoining surface of a fluid-flow machine. Either at least one sealing fin or alternatively an abradable coating AB (as shown here) can be provided on the bottom side of the internal support IT or on the stated surface OF.

The internal support IT can form a ring segment extending in the circumferential direction over one or more blades or a complete ring closed in the circumferential direction.

The following describes, among other things, holding structures connecting the bases F(i), F(i+1) on the one hand and the internal support IT on the other. These holding structures can have, at least in the meridional plane section, an elongated shape and be formed in particular by a holding finger. It can be provided here that a holding structure is formed in one piece with a base or with the internal support respectively. The following describes such holding structures as examples on the basis of a holding finger of elongated design (straight or curved) at least in the meridional plane section. This description applies as an example for alternative embodiments in which the holding structure is designed in a different way, for example as a short fixing stub.

The shroud structure DS is formed in FIG. 2a by the bases F(i), F(i+1) of the two member blade rows and by the internal support IT. The side of the base F(i) of the front row (i) facing away from the main flow and the side of the base F(i+1) of the rear row (i+1) facing the main flow adjoin each other along a flat and unstepped contact surface KF. The internal support IT is held jointly by the bases F(i), F(i+1) of the rows (i) and (i+1) and secures at the same time the cohesion of the two bases F(i), F(i+1) along the contact surface KF.

In the embodiment shown, the internal support IT has one holding finger each anchored in the base F(i), F(i+1) of the rows (i) and (i+1), respectively, i.e. a front holding finger VHF anchored in the base of the front row (i) and a rear holding finger HHF anchored in the base of the rear row (i+1). Each of these holding fingers fixes, due to its shape, the internal support IT in at least one direction, both in the member blade row (i) and in the member blade row (i+1), with each holding finger VHF, HHF engaging in a recess in the respective base F(i), F(i+1).

The recess in the base F(i) of the front row (i) is provided, relative to the axial direction x, on that side of the base F(i) facing the main flow, while the recess in the base F(i+1) of the rear row (i+1) is provided on that side of the base F(i+1) facing away from the main flow. The holding fingers VHF, HHF and the associated recesses can be of substantially rectangular shape (as shown here) or alternatively also substantially semi-dovetailed or dovetailed or triangular or wedge-shaped.

It can be provided that, as shown in FIG. 2a, the two holding fingers VHF, HHF face one another and in this way hold together the bases F(i), F(i+1) of the member blade rows (i) and (i+1) in the axial direction. It is favourable when the bases F(i), F(i+1) are jointly enclosed from underneath by an internal support IT with an approximately bracket-like cross-section. The internal support IT has in the meridional plane section an elongated base IT-B extending in the axial direction, from the two ends of which extend in each case an arm IT-A in the radial direction and in the direction of the main flow path, with the holding fingers VHF, HHF projecting at right angles from these arms IT-A.

In the variant in accordance with the invention as shown here, the front holding finger VHF is provided in the area close to the leading edge VK(i), relative to the main flow direction or to the axial direction, and the rear holding finger HHF is provided in the area close to the trailing edge HK(i+1).

In the variant shown here, the internal support IT extends, when viewed in the main flow direction, in the area of both bases F(i), F(i+1) of the member blade rows (i) and (i+1), and hence along a distance which is wide in this axial direction. It is provided here that—when viewed in the meridional plane—two tangents applied, orthogonally to the axial direction, to the internal support IT from the front and rear are at a distance XIT, that two tangents applied, orthogonally to the axial direction, to the base F(i) of the row (i) from the front and rear are at a distance XB(i), and that two tangents applied, orthogonally to the axial direction, to the base F(i+1) of the row (i+1) from the front and rear are at a distance XB(i+1) and that for the distances XIT, XB(i) and XB(i+1) the following applies:

$$0.75 < XIT/(XB(i)+XB(i+1)) < 1.1$$

It can be provided that in the vicinity of the bottom side of the internal support at least three sealing fins are provided for reducing leakage flows through the cavity. Four or more sealing fins can be advantageous. It can furthermore be favourable to have sealing fins arranged on the rotor shaft and opposite the radially inward-facing surface of the internal support IT. This can be, as shown here, a straight arrangement or, as not shown here, a staged arrangement of sealing fins. A substantially rectangular joint outer outline of the two bases F(i), F(i+1) and of the internal support IT can also be advantageous.

For a detailed view of the geometry in accordance with the invention, FIG. 2a shows a section A-A, by means of which the blade arrangement can be described more precisely in the following. The section A-A extends along a meridional flow line at a short distance from the inner main flow path boundary HB.

Figure 2B:
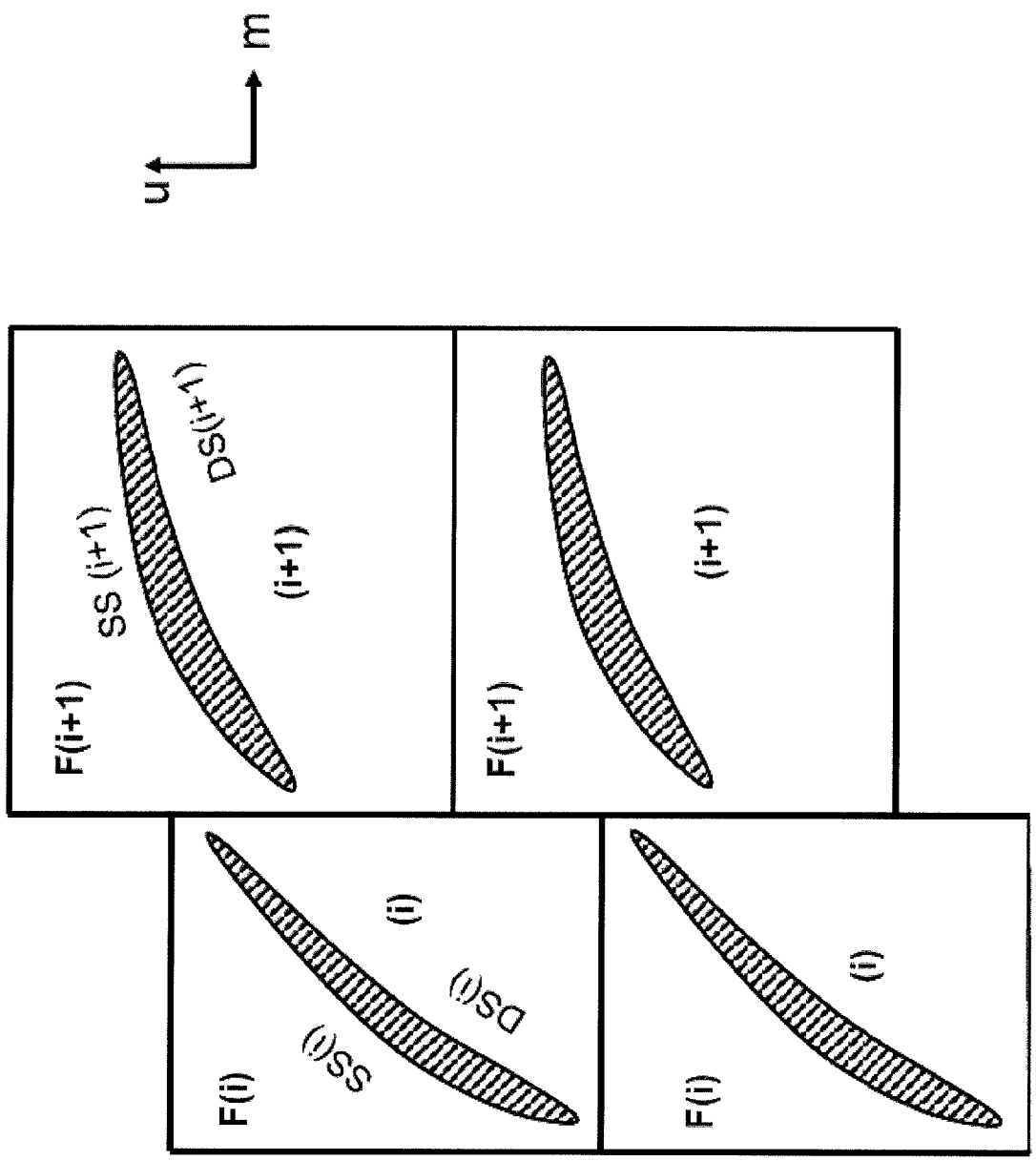
FIG. 2b shows an arrangement of two member blade rows in accordance with the present invention (circumferential view in section A-A from FIG. 2a).

FIG. 2b shows the stator vane row arrangement in accordance with the present invention in section A-A from FIG. 2a, hence in a plane established by the meridional coordinate m and the circumferential coordinate u. The base F(i), F(i+1) of the blades is formed in the representation selected here by individual blade roots. The substantially convex suction sides of the blades of the rows (i) and (i+1) are marked SS and the substantially concave pressure sides are marked DS.

In FIG. 2c too, the base F(i), F(i+1) of the blades of both rows (i) and (i+1) is formed by individual blade roots, with the bases F(i), F(i+1) of the blade rows (i) and (i+1) having a parallelogram-like outline. It is favourable here when the front corners of the base of the rear row (i+1) directly adjoin the rear corners of the base of the front row (i). The lateral edges of the bases F(i), F(i+1) of the rows (i) and (i+1) form here a straight or alternatively an angled line. In the case of an angled line, it is advantageous when the angle included between the lateral edges and the axial direction is smaller at the rear row (i+1) than at the front row (i).

Figure 2D:
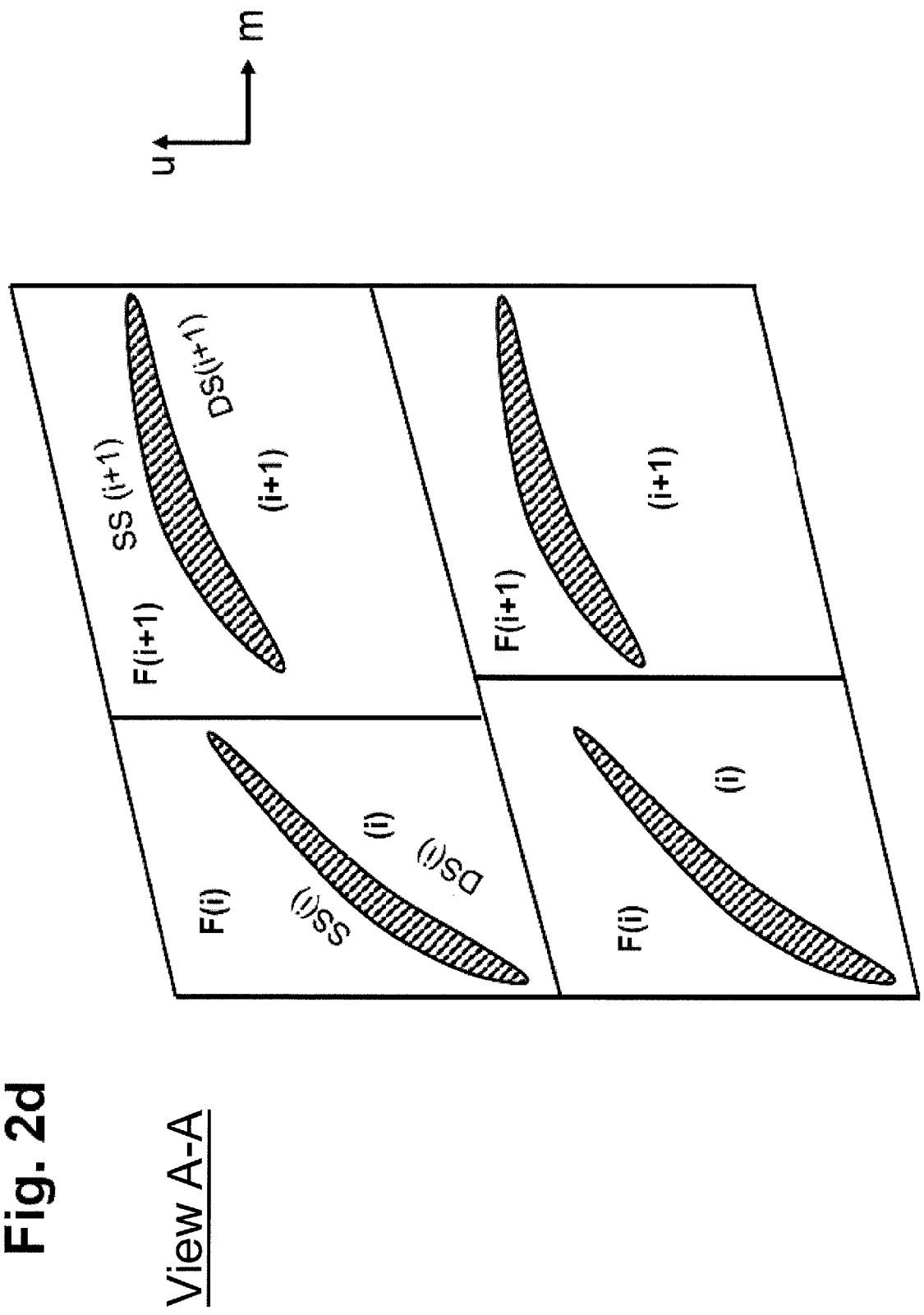
FIG. 2d shows an arrangement of two member blade rows in accordance with the present invention (circumferential view in section A-A from FIG. 2a).

FIG. 2d shows an arrangement in accordance with the present invention, where the base F(i), F(i+1) of the blades of both rows (i) and (i+1) is formed by individual blade roots, with the bases F(i), F(i+1) of the blade rows (i) and (i+1) having a parallelogram-like outline, and the lateral edges of the bases of the rows (i) and (i+1) extending parallel. It is favourable when in each case a lateral edge of the front row (i) forms a straight line jointly with a lateral edge of the rear row (i+1). It can be furthermore be advantageous when those edges of the bases F(i) of the front row (i) facing away from the main flow jointly with those edges of the bases of the rear row (i+1) facing the main flow are each provided constant in the circumferential direction, but alternatingly axially offset from blade to blade, to ensure a fixed relative position between the blades of the front row (i) and the rear row (i+1). It is favourable here when every second blade of a row (i) or (i+1) has the same blade root geometry.

Figure 2E:
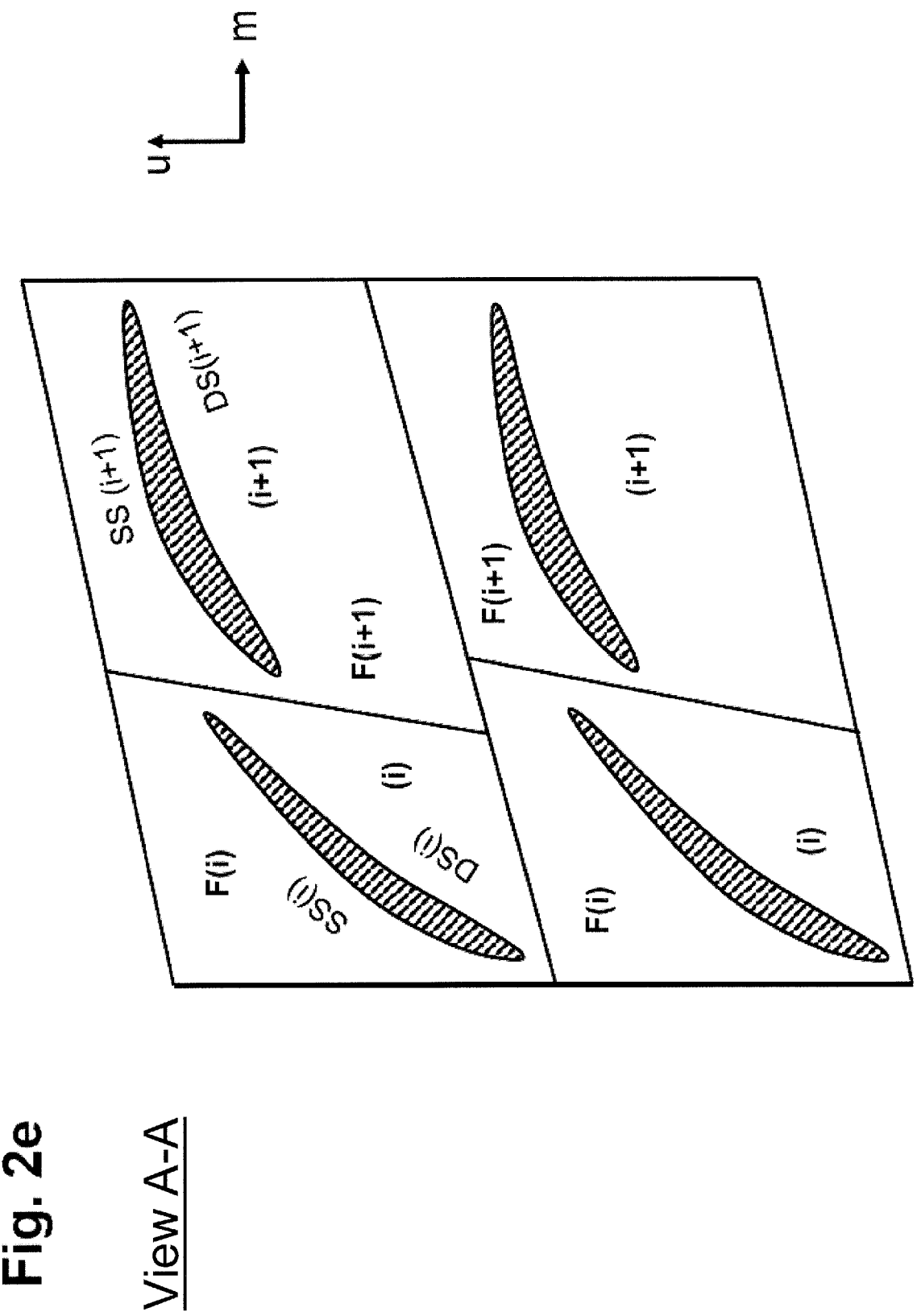
FIG. 2e shows an arrangement of two member blade rows in accordance with the present invention (circumferential view in section A-A from FIG. 2a).

FIG. 2e shows an arrangement in accordance with the present invention in which those edges of the bases of the front row (i) facing away from the main flow jointly with those edges of the bases of the rear row (i+1) facing the main flow, extend obliquely relative to the circumferential direction in each case, to ensure a fixed relative position between the blades of row (i) and row (i+1). It is favourable here when each further blade of a row (i) or (i+1) has the same blade root geometry.

Figure 2F:
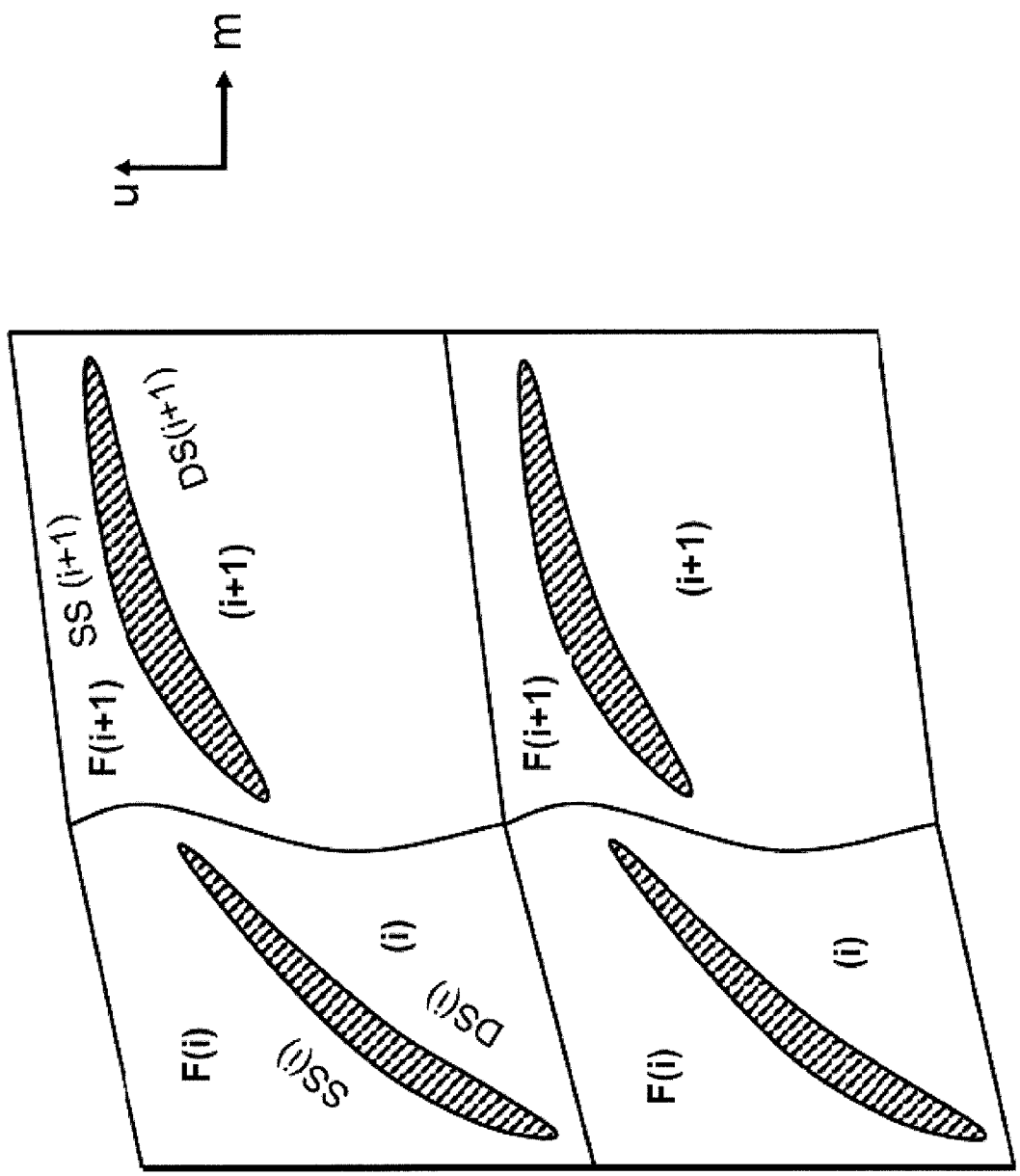
FIG. 2f shows an arrangement of two member blade rows in accordance with the present invention (circumferential view in section A-A from FIG. 2a).

FIG. 2f shows an arrangement in accordance with the present invention in which those edges of the bases of the front row (i) facing away from the main flow jointly with those edges of the bases of the rear row (i+1) facing the main flow, extend contoured and with a varying axial position in the circumferential direction in each case, to ensure a fixed relative position between the blades of row (i) and row (i+1). A curved course is particularly advantageous. It is favourable here when each blade of a row (i) or (i+1) has the same blade root geometry.

Figure 3:
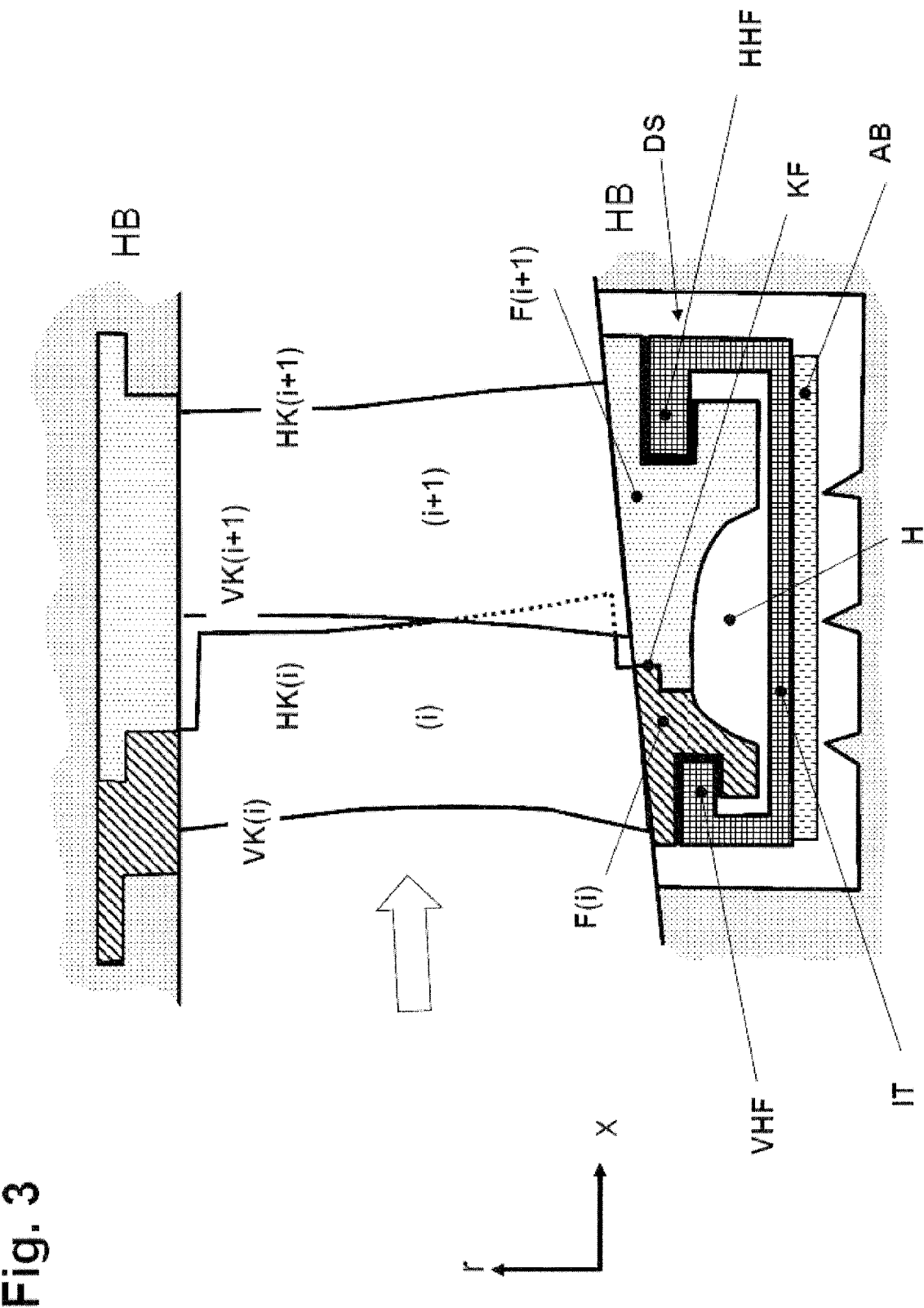
FIG. 3 shows a further stator vane group in accordance with the present invention, with saddle base.

FIG. 3 shows, similarly to FIG. 2a, in a meridional plane established by the axial direction x and the radial direction r a stator vane row group in accordance with the present invention including two directly adjacent stator vane rows (i) and (i+1).

In the area of the inner fixed blade end, the blade profiles associated with the member blade rows are provided on a base F(i), F(i+1). In at least one meridional plane established by the axial direction x and the radial direction r, the bases F(i), F(i+1) of two adjacent member blade rows (i) and (i+1) adjoin one another at at least one point on the main flow path boundary.

It can be provided here, as shown in FIG. 3, that two adjacent member blade rows (i) and (i+1) adjoin each other along a contact surface KF extending from the main flow path boundary and provided with a step, so that a mutual seating between the rows (i) and (i+1) is assured.

The shroud structure DS in FIG. 3 is also formed by the bases F(i), F(i+1) of the member blade rows (i) and (i+1) and by the internal support IT.

Shown as examples for this shroud structure DS, but also applicable in accordance with the invention for all other shroud structures described above or below, the dimensions of the blades and the bases are selected such that part of the blade profile of row (i) projects beyond its own base F(i) and onto the base F(i+1) of a blade of row (i+1).

As in FIG. 2a too, the base F(i) of row (i), the base F(i+1) of row (i+1) and the internal support IT jointly form a substantially closed cavity H inside the shroud structure DS.

Figure 4:
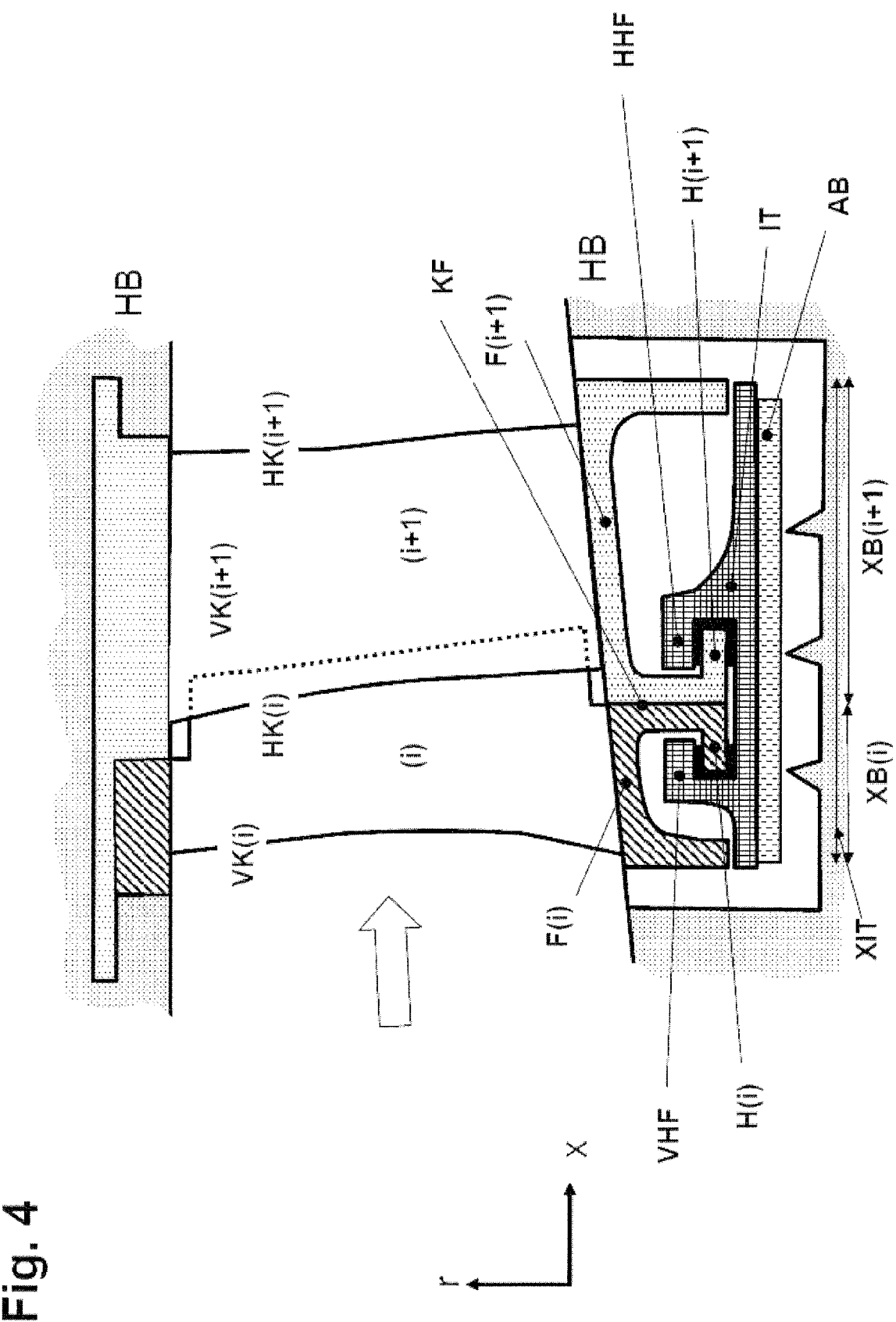
FIG. 4 shows a further stator vane group in accordance with the present invention, with back-to-back holding finger.

FIG. 4 also shows, in a meridional plane established by the axial direction x and the radial direction r a stator vane row group in accordance with the present invention including two directly adjacent stator vane rows. The two vane row members (i) and (i+1) as shown have at both vane ends a fixed connection to the structure forming the main flow path boundary.

In the area of the inner fixed blade end, the blade profiles associated with the member blade rows are provided on a base F(i), F(i+1). That side of row (i) facing away from the main flow and that side of row (i+1) facing the main flow adjoin each other along a flat and unstepped contact surface KF. The internal support IT is held jointly by the bases F(i), F(i+1) of the rows (i) and (i+1) and secures the cohesion of the two bases along the contact surface KF.

The base F(i) of row (i) has a holding finger H(i) substantially directed upstream and provided axially downstream of the leading edge VK(i). The base F(i+1) of row (i+1) has a holding finger H(i+1) substantially directed downstream and provided axially upstream of the trailing edge HK(i+1). The holding fingers H(i) and H(i+1) are each provided anchored in a recess in the internal support IT. The holding fingers H(i), H(i+1) and associated recesses are characterized in that, due to their shape, the internal support IT is fixed both in the member blade row (i) and in the member blade row (i+1) in at least one direction. The holding fingers H(i), H(i+1) and the associated recesses can be of substantially rectangular shape in accordance with the present invention (as shown here) or alternatively also substantially semi-dovetailed or dovetailed or triangular or wedge-shaped.

In the variant shown here too, it can be advantageous when the internal support IT, viewed in the main flow direction, extends over both bases in the member blade row of the member blade rows (i) and (i+1), and the following applies:

$$0.75 < XIT/(XB(i) + XB(i+1)) < 1.1$$

The bases F(i), F(i+1) of the rows (i) and (i+1) and the internal support IT are designed such that the internal support IT forms jointly with a base F(i), F(i+1) respectively a substantially closed cavity (total of 2 cavities) inside the shroud structure.

Figure 5:
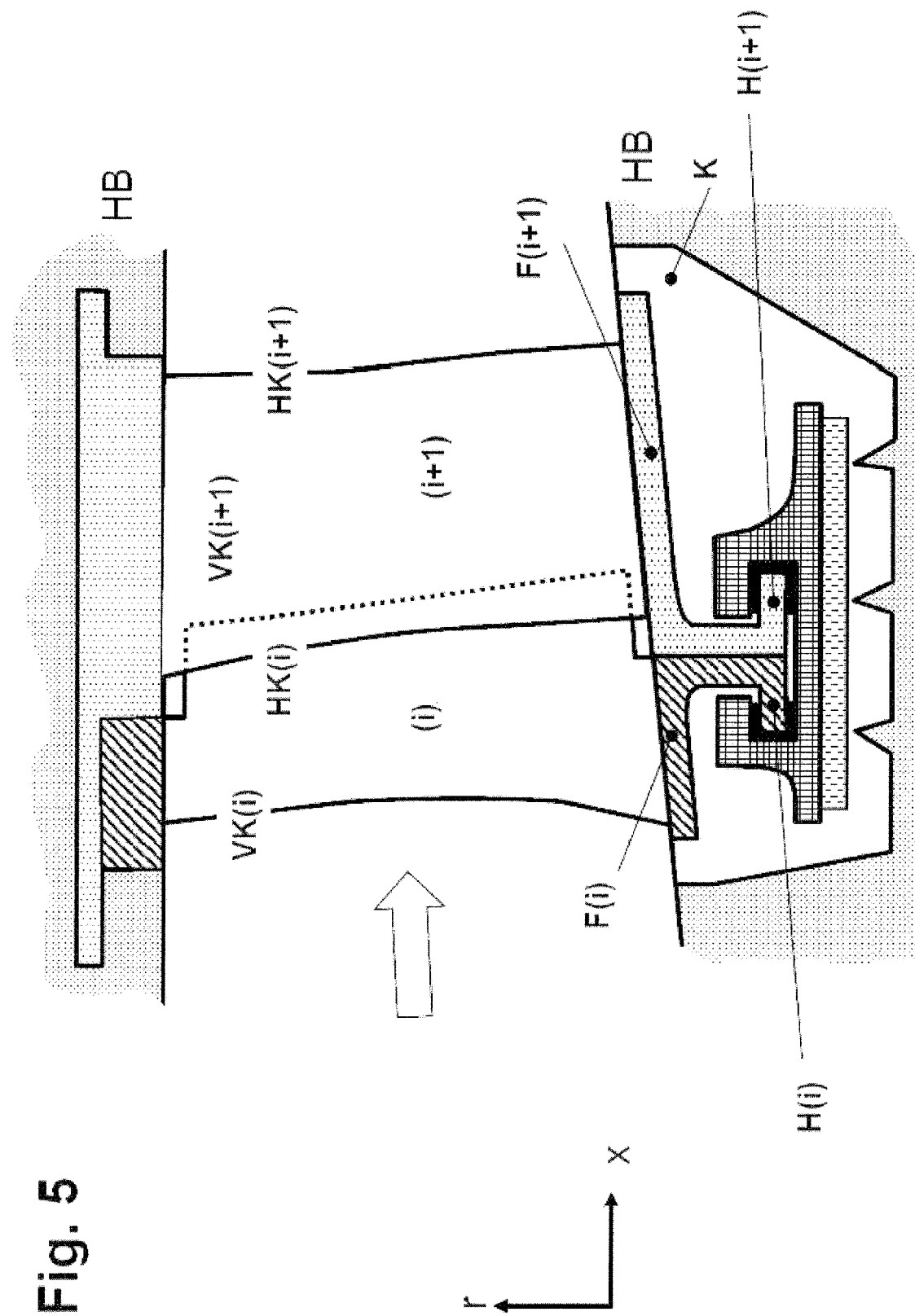
FIG. 5 shows a further stator vane group in accordance with the present invention, with back-to-back holding finger.

FIG. 5 shows a shroud structure similar to that in FIG. 4; here, however, the spaces formed between the internal support IT and the bases F(i), F(i+1) are open towards the cavity K.

Figure 6:
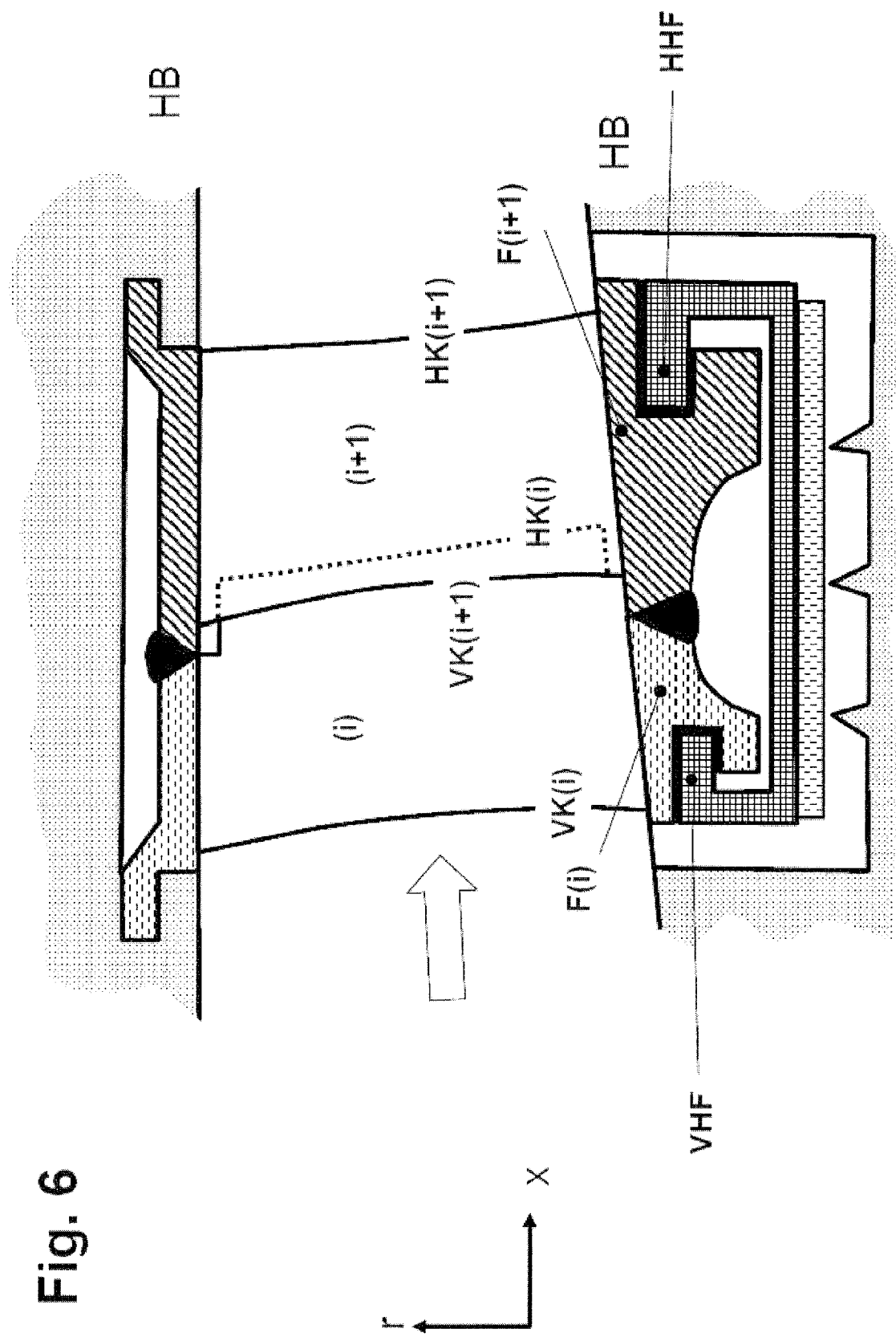
FIG. 6 shows a further stator vane group in accordance with the present invention, with welded/brazed connection.

FIG. 6 shows a shroud structure similar to that in FIG. 2a; here, however, the bases F(i), F(i+1) of the rows (i) and (i+1) do not adjoin one another loosely at the contact surface KF, but are connected by means of a welded or brazed connection.

Figure 7:
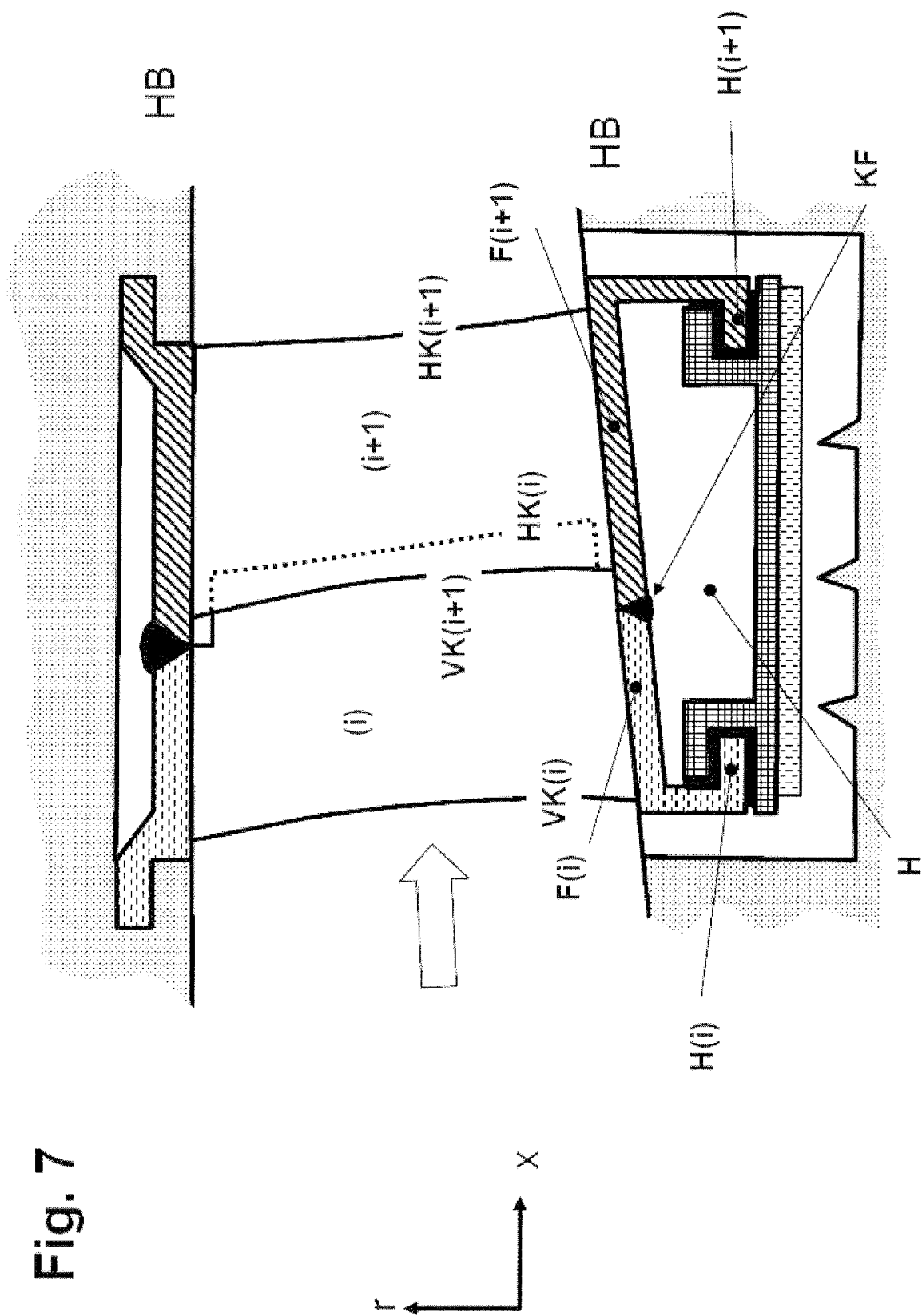
FIG. 7 shows a further stator vane group in accordance with the present invention, with welded/brazed connection.

FIG. 7 shows a shroud structure similar to that in FIG. 6. That side of the base F(i) of row (i) facing away from the main flow and that side of the base F(i+1) of row (i+1) facing the main flow adjoin each other along a flat and unstepped contact surface KF and are connected by means of a welded or brazed connection. The internal support IT is held jointly by the bases of the rows (i) and (i+1).

The base F(i) of row (i) has a holding finger H(i) substantially directed downstream and provided in the area close to the leading edge VK(i), when viewed in the main flow direction or in the axial direction. The base F(i+1) of row (i+1) has a holding finger H(i+1) substantially directed upstream and provided in the area close to the trailing edge HK(i+1), when viewed in the main flow direction or in the axial direction. The holding fingers H(i) and H(i+1) are each anchored in a recess in the internal support IT and face one another. The holding fingers and recesses are characterized in that, due to their shaping, the internal support IT is fixed both in the member blade row (i) and in the member blade row (i+1) in at least one direction. The holding fingers and recesses can be of substantially rectangular shape in accordance with the present invention (as shown here) or alternatively also substantially semi-dovetailed or dovetailed or triangular or wedge-shaped.

In the variant of FIG. 7 too, it can be advantageous when the internal support IT, when viewed in the main flow direction, extends over both bases of the member blade rows (i) and (i+1), and the following applies:

$$0.75 < XIT/(XB(i) + XB(i+1)) < 1.1$$

The bases F(i), F(i+1) of the rows (i) and (i+1) and the internal support IT are designed such that the internal support IT forms jointly with the two bases F(i), F(i+1) a substantially closed cavity H inside the shroud structure.

Figure 8:
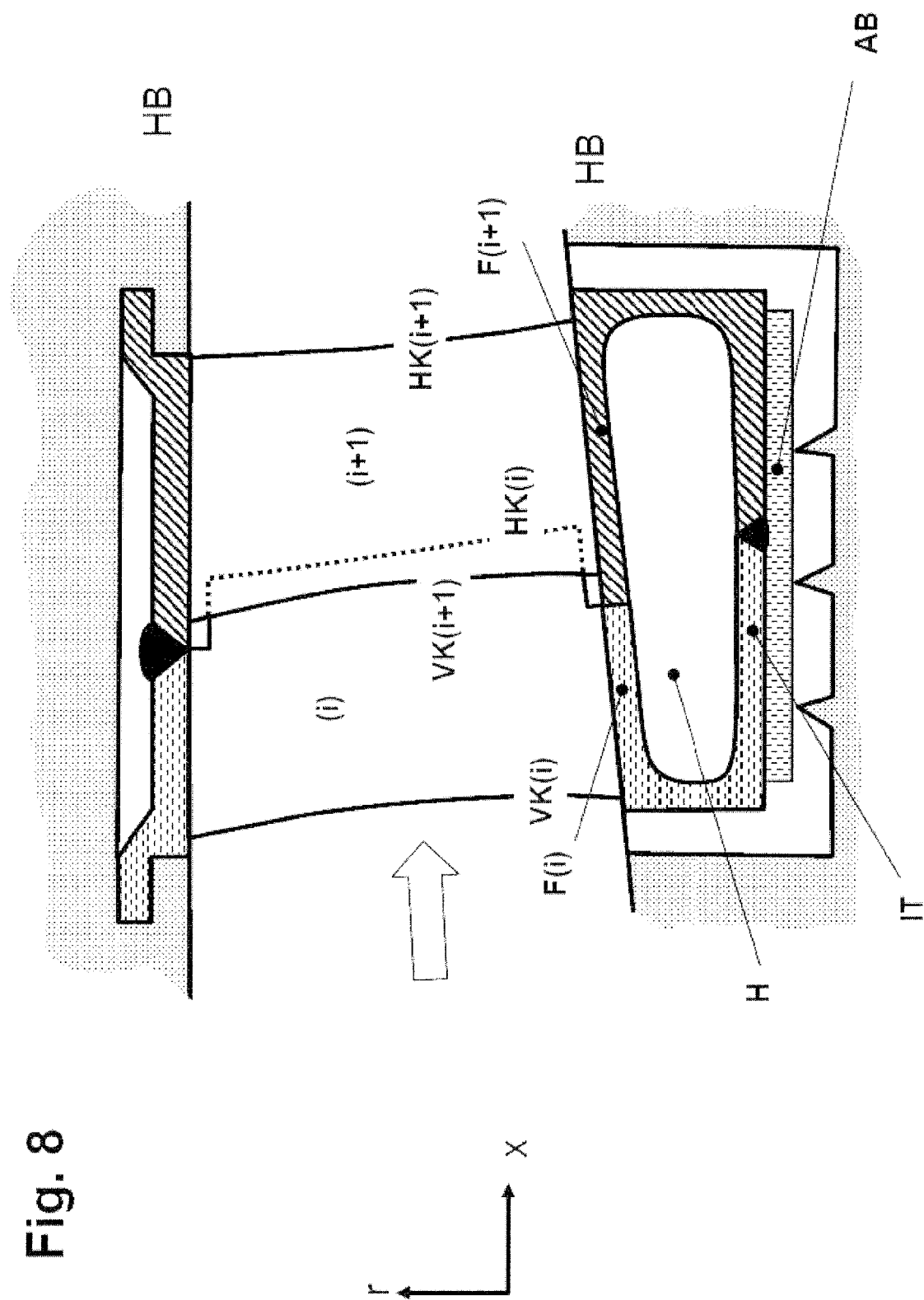
FIG. 8 shows a further stator vane group in accordance with the present invention, with welded/brazed connection.

FIG. 8 shows a shroud structure similar to that in FIG. 7. Here, however, the bases F(i), F(i+1) of the rows (i) and (i+1) and the internal support IT are structurally integrated such that at least one of the bases F(i), F(i+1) forms with at least part of the internal support IT a joint component.

It is provided in the embodiment of FIG. 8 that the bases F(i), F(i+1) of the rows (i) and (i+1) are each structurally integrated with part of the internal support IT. The two parts of the internal support IT can be connected for example by means of a welded or brazed connection. Additionally or alternatively also the bases F(i), F(i+1) can be connected to each other by a welded or brazed connection. It can furthermore be advantageous when a joint radially inward-facing surface is formed, on which an abradable coating or an arrangement of sealing fins can be applied if necessary.

It can likewise be provided that substantially the base F(i) of the front row (i) is structurally integrated with the internal support IT. It can be provided here that starting from row (i), a radially inward-facing surface is formed on which an abradable coating or an arrangement of sealing fins can be applied if necessary.

It can likewise be provided that substantially the base F(i+1) of the rear row (i+1) is structurally integrated with the internal support IT. It can be advantageous here that starting from row (i+1), a radially inward-facing surface is formed on which an abradable coating or an arrangement of sealing fins can be applied if necessary.

It can furthermore be provided that a substantially closed cavity H is created in the shroud structure by one of the designs described above. It can be advantageous here when the cavity H is provided over at least 75% of the common axial extent of the bases F(i), F(i+1).

Furthermore it can be provided that the bases F(i), F(i+1) of the rows(i) and (i+1) are connected to one another by means of a welding or brazing process on the radially inward-facing surface (bottom side), as shown in FIG. 8.

Figure 9:
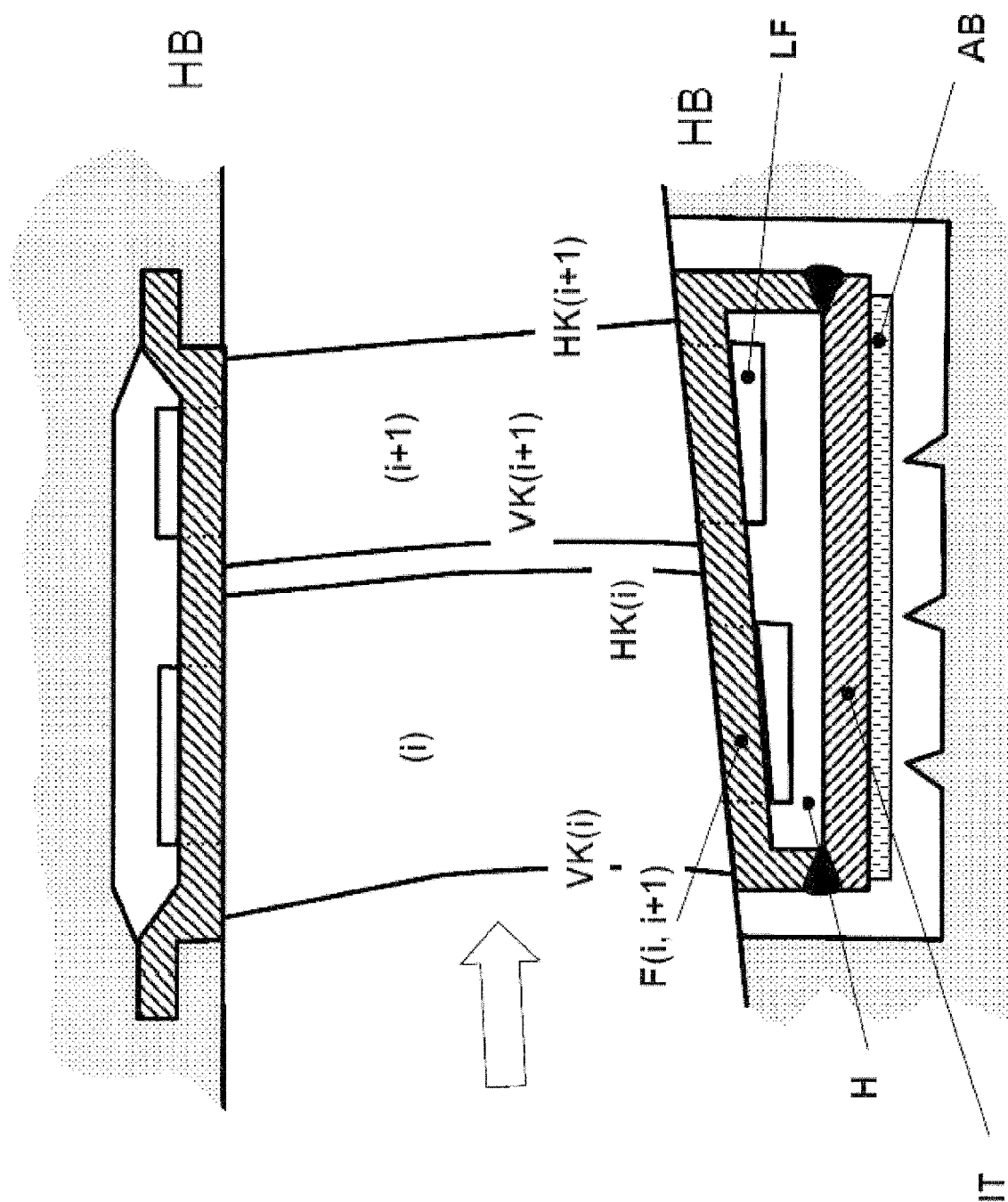
FIG. 9 shows a further stator vane group in accordance with the present invention, with welded/brazed connection.

FIG. 9 shows a shroud structure similar to that in FIG. 8. Here, however, the bases of the rows (i) and (i+1) are structurally integrated with one another (integral one-part design) and form a common overall base F(i, i+1). It can be provided here that the blade profiles (i, i+1) are made on one of the two or on both member blade rows separately from the base F(i, i+1) and fastened using bracket-like projections LF, which extend substantially as a prolongation of the profile beyond the main flow path boundaries HB and into the base F(i, i+1). If necessary, a joining process provides the positive connection between the brackets LF and the base F(i, i+1).

The base F(i, i+1) in FIG. 9 is connected to the internal support IT at two positions by means of a brazing or welding process. It can be advantageous here when at least one of the components—the base F(i, i+1) and the internal support IT—has a substantially U-shaped cross-section in the meridional view (x-r).

It can furthermore be advantageous when both components—the base F(i, i+1) and the internal support IT—have a substantially U-shaped cross-section in the meridional view (x-r). It can furthermore be advantageous when one of the components—the base F(i, i+1) and the internal support IT—has a substantially rectangular cross-section in the meridional view (x-r).

It can furthermore be provided that one of the components—the base F(i, i+1) and the internal support IT—has a substantially U-shaped cross-section in the meridional view (x-r), and the other component (base F(i, i+1) or internal support IT) has a substantially rectangular cross-section in the meridional view (x-r).

It can furthermore be provided that the base F(i, i+1) and the internal support IT are connected to one another by means of a welded or brazed connection on the axially upstream-facing surface (front side) axially in the area of the leading edge VK(i) and on the axially downstream-facing surface (rear side) axially in the area of the trailing edge HK(i+1).

The base F(i, i+1) and the internal support IT in FIG. 9 are designed such that the internal support IT forms jointly with the base F(i, i+1) a substantially closed cavity H inside the shroud structure.

It can be provided that the radially inward-facing surface (outer surface) is formed by the internal support IT, on which surface an abradable coating AB or an arrangement of sealing fins is applied if necessary.

Figure 10:
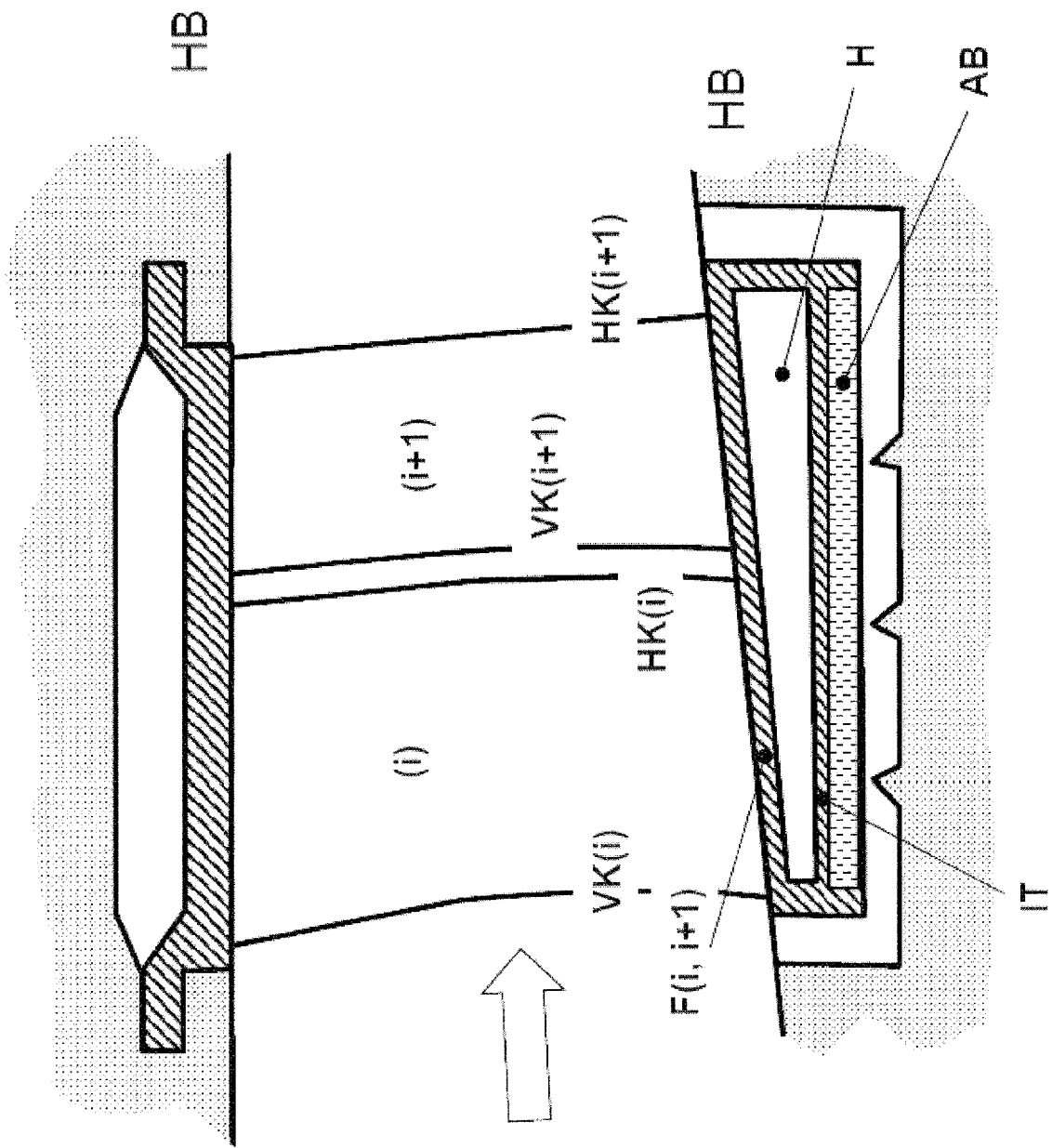
FIG. 10 shows a further stator vane group in accordance with the present invention, with integral design

FIG. 10 shows a shroud structure similar to that in FIG. 9. Here, however, the overall base F(i, i+1) of the rows (i) and (i+1) and the internal support IT are structurally integrated with one another (integral one-part design). Here too, a radially inward-facing surface is formed on the shroud structure, on which surface an abradable coating AB or an arrangement of sealing fins can be applied if necessary.

It can be provided that a substantially closed cavity H is arranged inside the shroud structure.

It can furthermore be provided that the base F(i), F(i+1) of at least one blade each of the rows (i) and (i+1) and the internal support IT are manufactured as an integral component. For this purpose, a laser-assisted production method can be provided, as for example laser sintering, laser printing, direct laser depositioning or related processes. Alternatively, a casting or injection moulding process can be provided.

Furthermore, it can be provided that on the radially inward-facing surface of the shroud structure an abradable coating AB is provided which likewise belongs to the integral component and accordingly is manufactured in a standardized laser-assisted production method jointly with at least one blade each of the rows (i) and (i+1) and the internal support.

Figure 11:
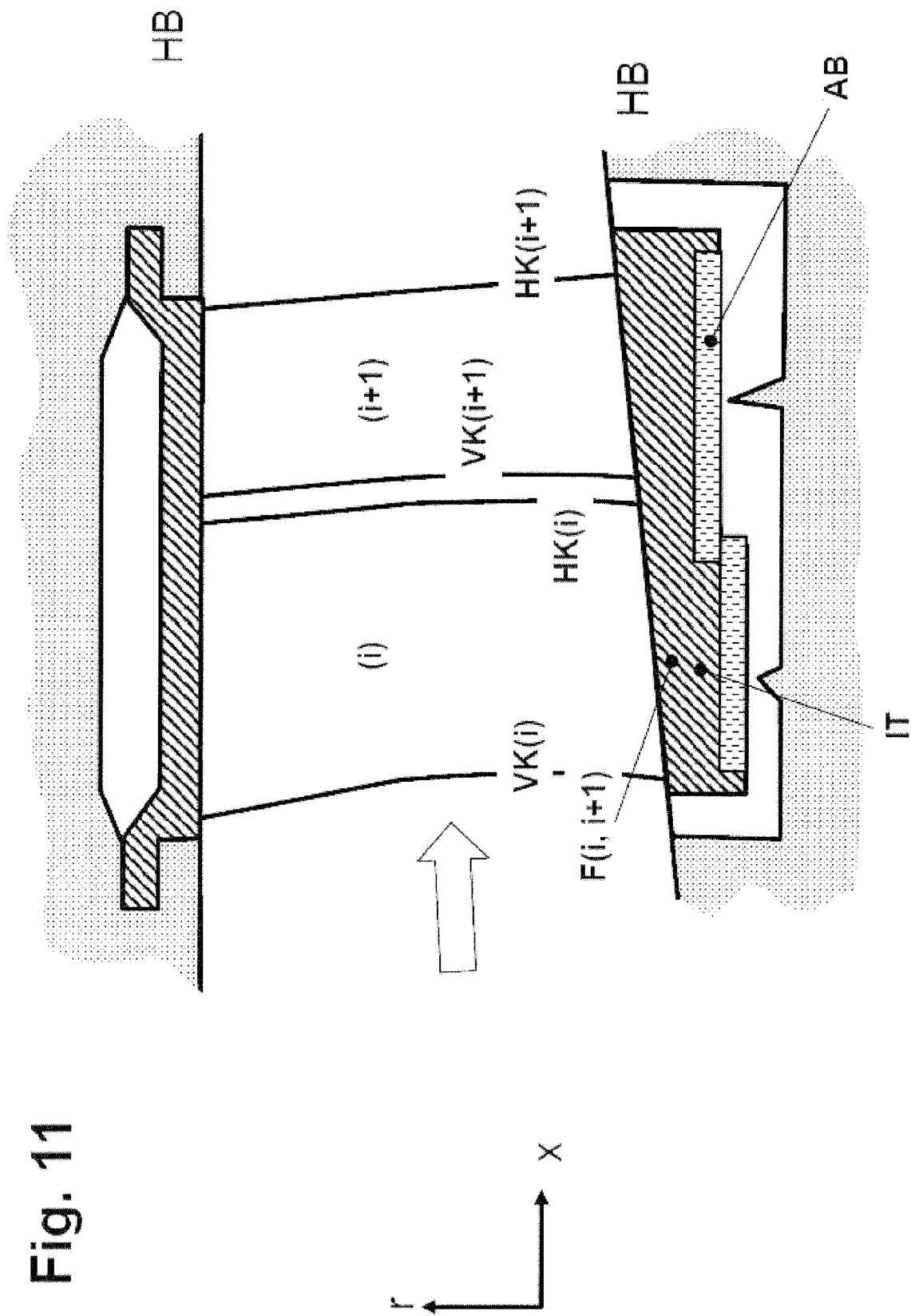
FIG. 11 shows a further stator vane group in accordance with the present invention, with integral design.

FIG. 11 shows a shroud structure similar to that in FIG. 10. The bases of the rows (i) and (i+1) and the internal support IT are here structurally integrated with one another (integral one-part design), without forming a cavity, into an overall part. Here too, a radially inward-facing surface is formed on the shroud structure, on which surface an abradable coating AB or an arrangement of sealing fins can be applied if necessary.

It can be provided here that the inward-facing surface has at least one step. This applies for all configurations described in the foregoing.

It can furthermore be provided that between various components, for example a base and an internal support, anti-wear sleeves are used which have a low wall thickness and do not change the overall concept of the design. The term of adjoining or touching of a blade root structure and of the surrounding structure as described in the foregoing should accordingly also apply for the circumstance of adjoining or touching via an intermediate anti-wear sleeve.

The present invention, in its design, is not limited to the exemplary embodiments shown. For instance, the principles of the present invention can be applied analogously to rotor blade rows and to the fixation of radially outer blade ends of rotor blades to shroud structures in the area of the outer main flow path boundary.

What is claimed is:

1. A blade row group arrangeable in a main flow path of a fluid-flow machine, comprising:

a quantity N of member blade rows positioned adjacent one another and fixed relative to one another in both an axial direction (x) and a circumferential direction, with the quantity N of the member blade rows being at least 2 and with (i) designating a running index of quantity values between 1 and N, the member blade rows including a front member blade row with front blades (i) and a rear member blade row with rear blades (i+1) provided in a meridional plane established by the axial direction (x) and a radial direction (r), a main flow path in which the quantity N of member blades rows is positioned, the main flow path including first and second main flow path boundaries (HB) on opposite sides of the main flow path, wherein at least one of the front blades (i) and at least one of the rear blades (i+1) each include a blade root structure fixed to the first main flow path boundary (HB), a surrounding structure forming at least a portion of the second main flow path boundary (HB), the surrounding structure including a cavity (K), a shroud structure (DS) positioned in the cavity (K), wherein the at least one of the front blades (i) and the at least one of the rear blades (i+1) respectively include a front base (F(i)) and a rear base (F(i+1)), with at least a portion of the front base (F(i)) and at least a portion of the rear base (F(i+1)) being positioned in the cavity (K) and being part of the shroud structure (DS), wherein the shroud structure (DS) further includes a support (IT) separate from the surrounding structure and positioned in the cavity (K), the support (IT) having a connection to at least one chosen from the front base (F(i)) and the rear base (F(i+1)), the connection being through one or more of 1) a positive locking connection and 2) being one piece with one or more of the front base (F(i)) and the rear base (F(i+1)), where the support (IT) includes a surface (OF) facing away from the main flow path and positioned opposite an adjoining surface of the cavity (K), wherein the shroud structure (DS) and the surrounding structure are, in operation of the fluid flow machine, rotationally movable relative to one another, around a central axis of the fluid-flow machine, wherein the front base (F(i)) and the rear base (F(i+1)) are separate from one another and are connected together by the support (IT), wherein a side of the front base (F(i)) facing downstream and a side of the rear base (F(i+1)) facing upstream adjoin each other along a contact surface (KF) including a step extending in the radial direction, to assure a mutual seating between the front and rear bases (F(i), F(i+1)).

2. The blade row group in accordance with claim 1, wherein the support (IT) is connected to the front and rear bases (F(i), F(i+1)), thus securing a connection of the front and rear bases (F(i), F(i+1)), with the support (IT) having a holding structure anchored to each of the front and rear bases (F(i), F(i+1)), the holding structure including a front holding structure (VHF) anchored to the front base (F(i)) and a rear holding structure (HHF) anchored to the rear base (F(i+1)), with each of the holding structures (VHF, HHF) fixing the support (IT) in the member blade row in at least one direction due to a shape of the support (IT).

3. The blade row group in accordance with claim 2, wherein the two holding structures (VHF, HHF) face one another and in this way hold together the front and rear bases (F(i), F(i+1)) in the axial direction.

4. The blade row group in accordance with claim 2, wherein the holding structures in a meridional plane (x, r) are of one of the following shapes:
a) rectangular
b) semi-dovetailed
c) dovetailed
d) triangular
e) wedge-shaped.

5. The blade row group in accordance with claim 1, wherein the front base (F(i)) includes a holding structure (H(i)) directed upstream and provided axially downstream of a blade leading edge of the front member blade row, and the rear base (F(i+1)) includes a holding structure (H(i+1)) directed downstream and provided axially upstream of a blade trailing edge of the rear member blade row, where the holding structures (H(i), H(i+1)) are each anchored in a recess inside the support (IT), with the support (IT) being fixed in at least one direction both in the front and in the rear member blade row, due to shapes of the holding structures and recesses.

6. The blade row group in accordance with claim 1, wherein the front and rear bases (F(i), F(i+1)) are jointly enclosed in a meridional plane (x, r) by the support (IT), with the support (IT) having a C-shaped cross-section.

7. The blade row group in accordance with claim 1, wherein, in a meridional plane (x, r), the front base (F(i)), the rear base (F(i+1)) and the support (IT) jointly form and enclose a closed cavity inside the shroud structure (DS).

8. The blade row group in accordance with claim 1, wherein the front and rear bases (F(i), F(i+1)) on the second main flow path boundary (HB) form a surface closed in an entire area of the front and rear member blade rows and wetted by a main fluid flow in the main flow path.

9. A blade row group arrangeable in a main flow path of a fluid-flow machine, comprising:

a quantity N of member blade rows positioned adjacent one another and fixed relative to one another in both an axial direction (x) and a circumferential direction, with the quantity N of the member blade rows being at least 2 and with (i) designating a running index of quantity values between 1 and N, the member blade rows including a front member blade row with front blades (i) and a rear member blade row with rear blades (i+1) provided in a meridional plane established by the axial direction (x) and a radial direction (r), a main flow path in which the quantity N of member blades rows is positioned, the main flow path including first and second main flow path boundaries (HB) on opposite sides of the main flow path, wherein at least one of the front blades (i) and at least one of the rear blades (i+1) each include a blade root structure fixed to the first main flow path boundary (HB), a surrounding structure forming at least a portion of the second main flow path boundary (HB), the surrounding structure including a cavity (K), a shroud structure (DS) positioned in the cavity (K), wherein the at least one of the front blades (i) and the at least one of the rear blades (i+1) respectively include a front base (F(i)) and a rear base (F(i+1)), with at least a portion of the front base (F(i)) and at least a portion of the rear base (F(i+1)) being positioned in the cavity (K) and being part of the shroud structure (DS), wherein the shroud structure (DS) further includes a support (IT) separate from the surrounding structure and positioned in the cavity (K), the support (IT) having a connection to at least one chosen from the front base (F(i)) and the rear base (F(i+1)), the connection being through one or more of 1) a positive locking connection and 2) being one piece with one or more of the front base (F(i)) and the rear base (F(i+1)), where the support (IT) includes a surface (OF) facing away from the main flow path and positioned opposite an adjoining surface of the cavity (K), wherein the shroud structure (DS) and the surrounding structure are, in operation of the fluid flow machine, rotationally movable relative to one another, around a central axis of the fluid-flow machine, wherein a side of the front base (F(i)) facing downstream and a side of the rear base (F(i+1)) facing upstream adjoin each other along a contact surface (KF) including a step extending in the radial direction, to assure a mutual seating between the front and rear bases (F(i), F(i+1)).

10. A blade row group arrangeable in a main flow path of a fluid-flow machine, comprising:

a quantity N of member blade rows positioned adjacent one another and fixed relative to one another in both an axial direction (x) and a circumferential direction, with the quantity N of the member blade rows being at least 2 and with (i) designating a running index of quantity values between 1 and N, the member blade rows including a front member blade row with front blades (i) and a rear member blade row with rear blades (i+1) provided in a meridional plane established by the axial direction (x) and a radial direction (r), a main flow path in which the quantity N of member blades rows is positioned, the main flow path including first and second main flow path boundaries (HB) on opposite sides of the main flow path, wherein at least one of the front blades (i) and at least one of the rear blades (i+1) each include a blade root structure fixed to the first main flow path boundary (HB), a surrounding structure forming at least a portion of the second main flow path boundary (HB), the surrounding structure including a cavity (K), a shroud structure (DS) positioned in the cavity (K), wherein the at least one of the front blades (i) and the at least one of the rear blades (i+1) respectively include a front base (F(i)) and a rear base (F(i+1)), with at least a portion of the front base (F(i)) and at least a portion of the rear base (F(i+1)) being positioned in the cavity (K) and being part of the shroud structure (DS), wherein the shroud structure (DS) further includes a support (IT) separate from the surrounding structure and positioned in the cavity (K), the support (IT) having a connection to at least one chosen from the front base (F(i)) and the rear base (F(i+1)), the connection being through one or more of 1) a positive locking connection and 2) being one piece with one or more of the front base (F(i)) and the rear base (F(i+1)), where the support (IT) includes a surface (OF) facing away from the main flow path and positioned opposite an adjoining surface of the cavity (K), wherein the shroud structure (DS) and the surrounding structure are, in operation of the fluid flow machine, rotationally movable relative to one another, around a central axis of the fluid-flow machine, wherein the front base (F(i)) includes a holding structure (H(i)) directed upstream and provided axially downstream of a blade leading edge of the front member blade row, and the rear base (F(i+1)) includes a holding structure (H(i+1)) directed downstream and provided axially upstream of a blade trailing edge of the rear member blade row, where the holding structures (H(i), H(i+1)) are each anchored in a recess inside the support (IT), with the support (IT) being fixed in at least one direction both in the front and in the rear member blade row, due to shapes of the holding structures and recesses.

* * * * *